United States Patent
Schmidt (12)

(10) Patent No.: US 6,593,008 B2
(45) Date of Patent: Jul. 15, 2003

(54) MODIFIED FREEFORM FABRICATED PART AND A METHOD FOR MODIFYING THE PROPERTIES OF A FREEFORM FABRICATED PART

(76) Inventor: Wayde R. Schmidt, 7 Amberg Dr., Pomfret Center, CT (US) 06259

( * ) Notice: Subject to any disclaimer, the term of this patent is extended or adjusted under 35 U.S.C. 154(b) by 0 days.

(21) Appl. No.: 10/189,955

(22) Filed: Jul. 3, 2002

(65) Prior Publication Data

US 2003/0059595 A1 Mar. 27, 2003

Related U.S. Application Data

(63) Continuation of application No. 09/847,136, filed on May 2, 2001, now abandoned, which is a division of application No. 09/311,771, filed on May 13, 1999, now Pat. No. 6,228,437, which is a continuation-in-part of application No. 09/220,922, filed on Dec. 24, 1998, now abandoned.

(51) Int. Cl.$^7$ .......................... B32B 15/18; C04B 35/00
(52) U.S. Cl. ..................... 428/539.5; 428/543; 501/54
(58) Field of Search ............................ 428/539.5, 543; 501/94

(56) References Cited

U.S. PATENT DOCUMENTS

| | | |
|---|---|---|
| 4,929,704 A | 5/1990 | Schwark |
| 5,204,055 A | 4/1993 | Sachs et al. |
| 5,340,656 A | 8/1994 | Sachs et al. |
| 5,387,380 A | 2/1995 | Cima et al. |
| 5,490,882 A | 2/1996 | Sachs et al. |
| 5,490,962 A | 2/1996 | Cima et al. |
| 5,494,867 A | 2/1996 | Schwab et al. |
| 5,512,162 A | 4/1996 | Sachs et al. |
| 5,628,938 A | 5/1997 | Sangeeta et al. |
| 5,736,199 A | 4/1998 | Blucher |
| 5,738,817 A * | 4/1998 | Danforth et al. ............ 264/255 |
| 5,807,437 A | 9/1998 | Sachs et al. |
| 5,856,252 A | 1/1999 | Lange et al. |
| 5,962,135 A | 10/1999 | Walker et al. |
| 6,322,728 B1 * | 11/2001 | Brodkin et al. ............. 264/113 |

OTHER PUBLICATIONS

Strife, J.R. et al., A Study of the Critical Factors Controlling the Synthesis of Ceramic Matrix Composites from Preceramic Polymers:, Final Technical Report, Dec. 15, 1990, R90–917810–5, United Technologies Research Center, 22 pages, 27 figures.

Wesson, J.P. et al., "Novel Precursor Approaches for CMC Derived by Polymer Pyrolysis", Annual Technical Report, Dec. 15, 1991, R91–97005101, United Technologies Research Center, 13 pages, 16 figures.

Wesson, J.P. et al., "Novel Precursor Approaches for CMC Derived by Polymer Pyrolysis", Annual Technical Report, Dec. 15, 1992, R92–970051–2, United Technologies Research Center, 23 pages.

Schmidt, W.R., "Novel Precursor Approaches for CMC Derived by Polymer Pyrolysis", Final Technical Report, Feb. 15, 1994, R94–970051–3, United Technologies Research Center, 52 pages.

* cited by examiner

Primary Examiner—John J. Zimmerman
Assistant Examiner—Jason Savage

(57) ABSTRACT

The present invention is a process for modifying the properties of a porous freeform fabricated part by increasing its density and reducing its porosity. The porosity and density of a freeform fabricated part are altered by packing the pores in a freeform part with an infiltrant, such as a preceramic polymer. The process includes drawing a vacuum on or pressurizing the freeform part while it is in an infiltrant bath, thereby forcing the infiltrant into the pores of the freeform part. After removing the densified freeform part from the infiltrant bath, the freeform part is subjected to a treating process, such that the infiltrant within the pores transforms to a ceramic or ceramic-containing phase to thereby increasing the density of the freeform part.

3 Claims, No Drawings

MODIFIED FREEFORM FABRICATED PART AND A METHOD FOR MODIFYING THE PROPERTIES OF A FREEFORM FABRICATED PART

CROSS REFERENCE TO RELATED APPLICATION

This is a continuation of U.S. patent application, Ser. No.: 09/847,136, filed May 2, 2001, now abandoned which is a divisional of U.S. patent application Ser. No.: 09/311,771, filed May 13, 1999 now U.S. Pat. No.: 6,228,437, issued on May 8, 2001, which is a continuation-in-part (CIP) of U.S. patent application, Ser. No. 09/220,922, filed Dec. 24, 1998 now abandoned, the entirety of which is incorporated herein by reference.

TECHNICAL FIELD

This invention relates to freeform fabricated parts and in particular, to a method for modifying the properties of a freeform fabricated part by increasing its density.

BACKGROUND ART

As a result of the demand for ways to improve manufacturing efficiency and the need for rapid prototype development, freeform fabrication has become a popular method for manufacturing parts. Freeform fabrication originated with a process called stereolithography wherein a focussed ultra-violet laser scans the top of a bath of a photopolymerizable liquid polymer plastic material, thereby causing the top of the bath and the area just below the surface to polymerize. The polymerized layer is thereafter lowered into the bath and the laser scanning process is repeated until a second polymerized layer is formed. As the second polymerized layer forms, it bonds to the first layer. This process is repeated until a plurality of superimposed layers form the desired part. The shape of the part is first designed in a computer aided design system (i.e., a CAD/CAM system), which is linked to the machine performing the stereolithography process. Most freeform fabrication processes include a computer aided design system for coordinating the execution of the freeform fabrication process. In the case of stereolithography, the laser beam scans the area of the bath necessary to form the freeform fabricated part (hereinafter referred to as "freeform part") designed on the computer aided design system.

The ability to produce an actual part directly from a design provides many advantages. One advantage includes eliminating the time traditionally used to develop the necessary tooling to manufacture the freeform part. Another advantage includes reducing the amount of machining, such as grinding, milling, drilling, etc., required to complete the part because the freeform fabrication process produces a substantially readily usable final product. Minimizing the amount of hands-on machining, therefore, translates into reducing the amount of potential human error and increasing efficiency. The amount of time saved in preparing for manufacturing also makes the freeform fabrication process attractive for rapid prototype development, which has been one of the main interests surrounding this technology in recent years. The benefit of rapid prototyping includes the ability to manufacture various configurations in a short amount of time, thereby providing designers with actual models of their designs.

Another method of freeform fabrication includes a technique called Three-Dimensional Printing (3DP), which consists of depositing a powdered material (e.g., a powdered ceramic, powdered metal, powdered plastic, or combination thereof) in sequential layers, one on top of the other. After depositing each layer of powdered material, a liquid binder is selectively supplied to the layer of powdered material using a type of ink-jet printing technique in accordance with a computer model of the three-dimensional part being fabricated. Following the sequential application and binding all of the required powder layers, the unbound powder is removed, thereby resulting in the formation of the designed three-dimensional part.

A third method of freeform fabrication includes Selective Laser Sintering (SLS). SLS includes a process whereby a powder dispenser deposits a layer of powdered material into a target area. A laser control mechanism, which typically includes a computer that houses the design, modulates and moves the laser beam to selectively sinter a layer of powder dispensed in the target area. Specifically, the control mechanism operates to selectively sinter only the powder disposed within the defined boundaries of the design. The control mechanism operates the laser to selectively sinter sequential layers of powder, producing a completed part comprising a plurality of layers sintered together yielding the completed design.

A fourth method of freeform fabrication includes Ballistic Particle Manufacturing (BPM). BPM uses an ink-jet printing apparatus wherein an ink-jet stream of liquid polymer or polymer composite material is used to create three-dimensional objects under computer control, similar to the way an ink-jet printer produces two-dimensional graphic printing. The device is formed by printing successive cross-sections, one layer after another, to a target using a cold welding or rapid solidification technique, which causes bonding between the particles and the successive layers.

An additional freeform fabrication technique, includes Fused Deposition Modeling (FDM). FDM consists of building solid objects in a layering fashion from polymer/wax compositions by following the signals produced by a computer aided design system. Specifically, FDM builds structures by extruding a fine filament of plastically deformable material through a small nozzle. The computer aided design system appropriately directs the nozzle over a build surface in the x, y and z directions, thereby creating a three-dimensional object that resembles the design.

Another method of freeform fabrication includes a technique called Photochemical Machining, which uses intersecting laser beams to selectively harden or soften a polymer plastic block. The underlying mechanism used is the photochemical cross-linking or degradation of the material. U.S. Pat. No. 5,490,962 provides a detailed summary of each of the above mentioned freeform fabrication techniques and is hereby incorporated by reference.

The specific processes described above as being suitable for forming products of the present invention are inherently free of fiber reinforcement. In the main, these processes result in the manufacture or production of a freeform based on particulate material. As distinct from the prior art directed to making preforms, articles made by the present invention do not use fiber reinforcement and therefore are fiber free.

The methods described above, however, often result in the fabrication of a porous freeform part, thereby creating undesirable mechanical properties for the freeform part. A freeform part having inadequate strength, unsatisfactory hardness, low temperature tolerance, low abrasion resistance, rough surface finish, poor bonding of individual layers or poor bonding of powder particles within the layers presents a significant limitation to the types of applications in which freeform parts can be utilized. Therefore, what is needed is a means for increasing the mechanical, thermal or other physical properties of freeform parts.

DISCLOSURE OF INVENTION

The present invention exploits the porosity of a freeform fabricated part by packing the pores of a freeform part with an infiltrant that is capable of transforming to a ceramic or a ceramic-containing phase. The infiltrant comprises a preceramic polymer, which is selected to bond with the freeform part such that the resulting composition improves the mechanical, thermal and other characteristics of the freeform part. Packing the pores of the freeform part, therefore, increases its density and concomitantly decreases its porosity. Particularly, increasing the density of the freeform part increases one or more or all of the following properties: mechanical strength, hardness, temperature resistance, abrasion resistance, thermal conductivity, and erosion resistance. These properties may be enhanced by carefully fabricating the freeform part such that a certain porosity is imparted, selecting particular infiltrants with various concentrations that add the desired properties to the freeform part, and repeating the infiltration process until the desired density is achieved.

Accordingly, one aspect of the present invention is a process for modifying the properties of a porous freeform part comprising the steps of depositing a porous freeform part in an infiltrant bath, drawing a vacuum on the porous freeform part and the infiltrant bath such that the infiltrant enters the pores within the freeform part, and removing the densified freeform part from the infiltrant bath. The infiltrant is normally a preceramic polymer that is capable of transforming to a ceramic or a ceramic-containing phase. Furthermore, the preceramic polymer is preferably a polymer capable of nanocrystalline ceramic phase growth such that the preceramic polymer can enter the pores within the freeform part. Upon being removed from the infiltrant bath the density of the freeform part increases because the previously empty pores now contain infiltrant, and the infiltrant within the pores of the freeform part transforms to a ceramic or a ceramic-containing phase. Subjecting the freeform part to multiple infiltration processes further decreases the porosity of the freeform part and concomitantly increases its density.

A second embodiment of the present invention includes pressurizing the infiltrant as an alternative to or in conjunction with drawing a vacuum on the porous freeform part and the infiltrant bath such that the infiltrant enters the pores within the freeform part.

A third embodiment of the present invention includes heating the infiltrant while pressure is being applied.

A fourth embodiment of the present invention includes placing the porous freeform part in a vacuum dessicator, applying a vacuum and allowing an infiltrant to enter the vacuum dessicator such that the infiltrant enters the pores within the freeform part.

A fifth embodiment of the present invention includes subjecting the densified freeform part to a series of post-processing steps upon being removed from the infiltrant bath such that the infiltrant within the pores of the densified freeform part transforms to a ceramic or a ceramic-containing phase. The post-processing steps may include one or more or all of the following steps: curing the infiltrant, heating the infiltrant at a rate, duration and temperature such that the infiltrant transforms to a ceramic or ceramic-containing phase within the pores of the freeform article, annealing the transformed infiltrant and cooling the freeform fabricated part and the transformed infiltrant.

A still further embodiment of the present invention includes a freeform fabricated part having pores therein comprising a ceramic or a ceramic-containing phase disposed within a portion of the pores with the freeform part.

The foregoing features and advantages of the present invention will become more apparent in light of the following detailed description of exemplary embodiments thereof as illustrated in the accompanying drawings.

BEST MODE FOR CARRYING OUT THE INVENTION

Through conducting a series of experiments, the inventor of the present invention recognized that infiltrants such as preceramic polymers, which are inorganic or organic polymers that transform to ceramic when subjected to intense heat, are capable of infiltrating the pores of a freeform part. The inventor of the present invention also recognized that increasing the density of the freeform part with certain infiltrants improved the mechanical characteristics of the freeform part, which serves as a support structure for the infiltrants. Therefore, the present invention is a process comprising the steps of fabricating a freeform part, depositing the freeform part in an infiltrant bath, drawing a vacuum on the porous freeform part and the infiltrant bath such that the infiltrant enters the pores of the freeform, and subjecting the freeform part and infiltrant to a treating process that may include one or more post-processing steps. Freeform parts for use in practicing the method of the present invention were fabricated using a three-dimensional printing technique similar to that described in U.S. Pat. Nos. 5,204,055 and 5,340,656 and 5,387,380, which are hereby incorporated by reference. Although the freeform parts in these experiments were made using the three-dimensional printing technique, the present invention may be used with freeform parts made by virtually any known freeform fabrication technique such as stereolithography, selective laser sintering, fused deposition modeling, ballistic particle manufacturing, and photochemical machining. It is preferable that the freeform parts be capable of withstanding the type of post-processing steps associated with transforming an infiltrant to a ceramic or ceramic-containing phase. Three different types of freeform parts were fabricated using the three-dimensional printing technique. One was a ¼ inch by ¼ inch by 4 inch Acrysol bonded silicon carbide (SiC) part. Specifically, silicon carbide powder, manufactured by Washington Mills under the tradename SIKA I, was bonded by the organic binder Acrysol WS-24, which is an acrylic colloidal dispersion manufactured by Rohm & Haas. The second type of freeform part was a ¼ inch by ¼ inch by 1½ inch alumina part. In that instance, brown aluminum oxide ($Al_2O_3$) powder manufactured by Norton Company under the product code 7131 was bonded by the same Arysol WS-24 binder. The third type of freeform part was also a ¼ inch by ¼ inch by 1½ inch alumina part fabricated using the same brown aluminum oxide ($Al_2O_3$) powder manufactured by Norton Company mentioned above using the three-dimensional printing technique. However, this third type of freeform part was fabricated using the inorganic binder, colloidal silica ($SiO_2$), manufactured by the Norton Company under the tradename Nyacol. Although the three freeform-fabricated parts used in our experiments were manufactured using silicon carbide and aluminum oxide, other materials such as metal, ceramic and metal-ceramic composites could be manufactured using the three-dimensional printing technique. Additionally, organic and inorganic binders other than Arysol WS-24 and colloidal silica could be used in the three-dimensional printing process.

The original density of the three types of parts was about thirty percent (30%) to about thirty seven percent (37%). In other words, sixty three percent (63%) to about seventy percent (70%) of the three-dimensional fabricated freeform part was porous. Therefore, it may also be preferable to subject the freeform part to post-processing methods, such as mild sintering or annealing, but doing so only improves the density to about thirty eight percent (38%) to about thirty-nine (39%). In the method of the present invention, the density of a freeform part is increased by depositing the freeform part into an infiltrant bath consisting of a preceramic polymer (i.e., ceramic precursor), which can be an organic or inorganic polymer but is generally in the form of an inorganic polymer. Any preceramic polymer capable of transforming to a ceramic or a ceramic-containing phase having nanocrystalline structures therein may be used as an infiltrant. Although the preceramic polymers used in all of the following examples were in the form of a liquid or a sol-gel, the preceramic polymer could be in a number of other forms, such as an organic solvent based solution or a liquid dispersion containing solid particles. In the latter case, the liquid provides a medium to deliver particles into the pores of a fabricated freeform part.

hydridopolysilazane (PHPS), polysilazane, and poly (aluminosilazane). Other potential preceramic polymers that could be used as infiltrants include polysilane, polycarbosilazane, poly(borosilazane), polysiloxane and polycarbosilane, and other molecularly mixed polymers that are capable of producing nanocrystalline ceramics or metals or mixtures hereof. Various polysilanes, polysilazanes, silicon oxycarbide (SiOC), polycarbosilazane, polysiloxarie, perhydridopolysilazine and polycarbosilanes are commercially available. The alumina sol-gel used in Example 1 was prepared using a known process. The silicon oxycarbide (SiOC) used in Example 2 is produced by Allied Signal under the tradename Blackglas. The Blackgasä silicon oxycarbide (SiOC) actually consists of a monomer solution, Blackgasä 489A, and a catalyst, Blackglasä 489C, which are combined before the freeform-fabricated part is deposited into such a bath The perhydridopolysilazane used in Example 4 is sold by Tonen, and the polysilazane used in Examples 5 is distributed by UBE under the tradename Tyranno Coat. Although a poly(methylvinylsilane), a poly (aluminosilazane) or a poly(borosilazane) may not be manufactured on a commercial scale, it is known how to manufacture such preceramic polymers. Particularly, when using a poly(methylvinylsilane), it is preferred to use a reactive endblocked poly(methylvinylsilane) as described in a Final Technical Report entitled *Novel Precursor Approaches for CMC Derived by Polymer Pyrolysis* dated Feb. 15, 1994

TABLE 1

| Variable | No. 1 | No. 2 | No. 3 | No. 4 | No. 5 | No. 6 |
|---|---|---|---|---|---|---|
| Infiltrant | Alumina sol-gel | Black-glas ™ silicon oxycarbide | poly(methyl vinylsilane) (PMVS) | Perhydrido polysilazane (PHPS) | Tyranno Coat ™ Polysilazane | Polyaluminosilazane (PAS) |
| Vacuum Pressure | $5 \times 10^{-3}$ torr | $5 \times 10^{-3}$ torr | $5 \times 10^{-3}$ torr | $5 \times 10^{-3}$ torr | $5 \times 10^{-3}$ torr | $5 \times 10^{-3}$ torr |
| Vacuum Time | 5 to 60 min | 5 to 60 min | 5 to 60 min | 5 to 60 min | 5 to 60 min | 5 to 60 min |
| Composition of Curing Atmosphere | Air or oxygen | Nitrogen or argon | Argon | Air, Nitrogen or argon | Nitrogen or argon | Nitrogen |
| Curing Temperature | 110° C. | 85° C. | 150 to 250° C. | 100° C. | 110° C. | 80 to 200° C. |
| Curing Time | 2 hours | 5 to 12 hours | 1 to 3 hours | 1 to 3 hours | 1 to 3 hours | 1 to 3 hours |
| Composition of Converting Atmosphere | Air or oxygen | Nitrogen or argon | Argon | Air or Nitrogen or argon | Nitrogen or argon | Nitrogen |
| Initial Converting Temperature | 110° C. | 100° C. | 250° C. | 150° C. | 150° C. | 150° C. |
| Rate of Increasing Converting Temperature | 2 to 10° C./min | 2 to 10° C./min | 2 to 10° C./min | 2 to 10° C./min | 2 to 10° C./min | 2 to 10° C./min |
| Final Converting Temperature | 1000° C. | 1000° C. | 1000° C. | 1000° C. | 1000° C. | 1000° C. |
| Composition of Annealing Atmosphere | Air or oxygen | Nitrogen or argon | Argon | Air, Nitrogen or argon | Nitrogen or argon | Nitrogen |
| Annealing Temperature | 1000 to 1600° C. | 1000 to 1600° C. | 1000 to 1800° C. | 1000 to 1800° C. | 1000 to 1800° C. | 1000 to 1800° C. |
| Annealing Time | 1 to 8 hours | 1 to 8 hours | 1 to 8 hours | 1 to 8 hours | 1 to 8 hours | 1 to 8 hours |
| Rate of Cooling | 10° C./min | 10° C./min | 10° C./min | 10° C./min | 10° C./min | 10° C./min |

Referring to Table 1, the freeform parts were deposited in the following preceramic polymers: alumina sol-gel, silicon oxycarbide(SiOC), poly(methylvinylsilane) (PMVS), per-prepared under Government Contract No. F49620-91-C-0017 and/or a Final Technical Report entitled *A Study of the Critical Factors Controlling the Synthesis of Ceramic*

*Matrix Composites from Preceramic Polymers* prepared under Government Contract No. F49620-87-C-0093, which are both hereby incorporated by reference. The poly (methylvinylsilane) preceramic polymer was synthesized using a modified sodium-coupling reaction of component chlorosilanes to produce a family of reactive endblocked polymers. In particular, vinyldimethylsilyl end groups are incorporated into the polymer structure to retain desirable curing, ceramic conversion and stability characteristics. Dimethylsilyl and methylenedimethylsilyl groups are also incorporated into the polymer structure to increase flexibility of the polymer backbone and to increase the synthetic yield of the polymer. In general, the poly(methylvinylsilane) polymers produce carbon-rich silicon carbide ceramic materials upon thermal conversion. Also, when using a poly (aluminosilazane) as a preceramic polymer, it is preferred to produce such poly(aluminosilazane) using the method as described in a Final Technical Report entitled Silcon-Based Nanostructural Ceramics Derived from Polymer Precursors. Development of Processing, Structure & Property Relationships prepared under Government Contract No. F49620-95-C-0020 and/or in an article entitled Aluminum-27 and Silicon-29 *Solid State Nuclear Magnetic Resonance Study of Silicon Carbide/Aluminum Nitride Systems: Effect of Silicon/Aluminum Ratio and Pyrolysis Temperature* in Chemistry of Materials (1998). Single-source poly (aluminosilazane) precursors were prepared by reacting bexamethylcyclotrisilazane and triethylaluminum either neat or with both components dissolved in dry hexane at room temperature, using standard procedures for handling pyrophoric and air-sensitive materials. Network polymer compositions were designed by varying the ratio of the starting reactants. Physical properties of the resulting polymers also depended on the ratio of the starting reactants. The poly (aluminosilazane) precursors produce homogeneous blends of nanocrystalline silicon carbide, aluminum nitride and silicon nitride ceramics or solid solutions upon thermal conversion.

Continuing to refer to Table 1, individual freeform parts were deposited into a vacuum dessicator that contained each infiltrant. Although each infiltrant, other than the Tyranno Coatä polysilazane, was not a solution, it is possible to add a solvent to each infiltrant, thereby decreasing its concentration. Reducing the viscosity of the infiltrant in order to increase pore penetration by the infiltrant in the freeform part may be a viable reason for using a solvent to form a solution. After being deposited in the infiltrant bath, a vacuum is drawn on the freeform parts ranging from about 100 (torr) to about $5\times10^{-3}$ (torr). In these experiments, each freeform part and infiltrant were vacuum pressurized at a pressure of about $5\times10^{-3}$ (torr) for about five minutes to about sixty minutes. The time required to infiltrate the first freeform part with the infiltrant varied with each infiltrant because of the varying infiltrant viscosity and pore size. Upon packing (e.g., filling) at least a portion of the pores in the first freeform parts with the infiltrant, the freeform part, packed with infiltrant, was removed from the vacuum dessicator and cured, which increased the viscosity of the infiltrant such that the freeform parts retained the infiltrant within its pores. In these examples, all infiltrants were thermally cured, which is one method of radiation curing. Other radiation curing techniques include x-ray, microwave, visible or ultraviolet light, and electron beam radiation. Depending upon the composition of the infiltrant, it is also possible to chemically cure the infiltrant. For example, the Blackgasä silicon oxycarbide (SiOC) may cure by a chemical curing process without any external heat, due to the combination between the Blackglasä 489A and the Blackgasä 489C. Applying heat to the Blackglasä silicon oxycarbide (SiOC), however, reduces the curing time. Therefore, it is preferred to heat the Blackgasä silicon oxycarbide (SiOC) to a temperature of about 85° C. for about five to sixty minutes according to the manufacturer's recommendation. As mentioned above, the infiltrant can also include a solvent, but if so, the solvent must be removed from the infiltrant and freeform part prior to or during the curing stage.

After curing the infiltrant, the freeform part was placed in an O-ring sealed, fused silica tube (hereinafter referred to as "tube"), which controlled the temperature, atmosphere and pressure used in performing the converting stage. The tube was only capable of withstanding a temperature of about 1000 degrees Celsius. Therefore, the freeform part was transferred to a ceramic tube, such as an alumina or mullite tube before elevating the temperatures above about 1000 degrees Celsius. Depending upon the infiltrant's sensitivity to air, the composition of the atmosphere may include argon or nitrogen in order to maximize the transformation of the infiltrant to the desired ceramic or ceramic-containing phase. The converting stage comprises applying heat to the infiltrant and freeform part such that the infiltrant transforms to a ceramic or a ceramic-containing phase and bonds to the freeform part. Although it is preferred to increase the temperature of the atmosphere within the tube at a rate of about two degrees Celsius per minute (2° C./min) until the temperature of the atmosphere attains about one-thousand degrees Celsius (1000° C.), it is possible to perform the converting stage by raising the temperature at a faster rate ranging up to about ten degrees Celsius per minute (10° C./min).

In all instances, the freeform parts were also annealed by keeping the parts within the tube after the converting stage was complete and holding the temperature of the tube constant within a range of about one-thousand degrees Celsius (1000° C.) to about one-thousand eight hundred degrees Celsius (1800° C.) for about one hour to about eight hours. Annealing the infiltrant increases its crystalinity and initiates additional ceramic grain formation such that the density of the freeform part further increases. Finally, the freeform parts were cooled at a preferred rate of about ten degrees Celsius per minute (10° C./min) until the freeform part attained ambient conditions. It is also possible to cool the freeform part at a rate ranging from about two degrees Celsius per minute (2° C./min) to about ten degrees Celsius per minute (10° C./min).

Referring to Table 2, the resulting composition varied depending upon the material of the freeform part and the infiltrant.

TABLE 2

| Coupon Part Material | Infiltrant | Resulting Composition |
|---|---|---|
| $Al_2O_3$ | Alumina sol-gel | $Al_2O_3/Al_2O_3$ |
| $Al_2O_3$ | Blackglas ™ Silicon oxycarbide | $SiOC/Al_2O_3$ |
| $Al_2O_3$ | poly(methylvinyl-silane) (PMVS) | $SiC(+C)/Al_2O_3$ |
| $Al_2O_3$ | Perhydridopolysila-zane (PHPS) | $SiO_2$(with air)/ $Si_3N_4$(+Si)/$Al_2O_3$ |
| $Al_2O_3$ | UBE Tyranno Coat ™ Polysilazane | $Si_3N_4$(+Si)/$Al_2O_3$ |
| $Al_2O_3$ | Polyaluminosilazane (PAS) | $SiC/AlN/Si_3N_4/Al_2O_3$ |

TABLE 2-continued

| Coupon Part Material | Infiltrant | Resulting Composition |
|---|---|---|
| SiC | Alumina sol-gel | $Al_2O_3$/SiC |
| SiC | Blackglas ™ Silicon oxycarbide | SiOC/SiC |
| SiC | Poly(methylvinyl-silane) (PMVS) | SiC(+C)/SiC |
| SiC | Perhydridopolysila-zane (PHPS) | $SiO_2$ (with air)/ $Si_3N_4$(+Si)/SiC |
| SiC | UBE Tyranno Coat ™ Polysilazane | $Si_3N_4$(+Si)/SiC |
| SiC | Polyaluminosilazane (PAS) | SiC/AlN/$Si_3N_4$/SiC |

Although certain infiltrants may have destroyed a portion of the inter-particle bonds formed during the three-dimensional printing process, such as dissolution of the bond between an organic based binder and the three-dimensional printed part, the density of the resulting composition surpassed the density of the original freeform part. Specifically, upon undergoing the infiltration process described herein and infiltrating the freeform part with Blackgasä silicon oxycarbide (SiOC), poly (methylvinylsilane) (PMVS) Perhydridopolysilazane (PHPS), Tyranno Coat™ Polysilazane, and Polyaluminosilazane (PAS), the density of the freeform part increased to about fifty percent (50%) to about sixty percent (60%). The density of the freeform part infiltrated with the alumina sol-gel increased to about forty percent (40%) to about forty-five (45%).

The infiltration process of the present invention, therefore, decreased the porosity and increased the density of the freeform part. The density of each freeform part is further increased and its porosity further decreased upon repeating the process until the desired density and porosity are achieved. It is beneficial to practicing the process of the present invention to first engineer the porosity of the freeform part to receive the infiltrants. Specifically, by fabricating freeform articles having an adaptable porosity, varying the type of infiltrant, controlling the concentration of the infiltrant and subjecting the freeform part to various and multiple infiltration processes, one can manipulate the porosity and mechanical characteristics of a freeform article such that a freeform part having desired properties of hardness, strength and density is produced.

An alternate process for modifying the properties of a porous freeform-fabricated part comprises the further step of pressurizing the infiltrant after drawing a vacuum on infiltrant and freeform part. This pressurizing step increases the potential of packing the pores in the freeform part with the infiltrant.

Another alternate process comprises the steps of depositing an individual freeform part in a vacuum dessicator containing an infiltrant and pressurizing the infiltrant rather than drawing a vacuum. Regardless of whether a vacuum is drawn on the infiltrant and freeform part, it may also be beneficial to heat the infiltrant as pressure is being applied in order to initiate curing of the infiltrant within the pores of the freeform part.

Still another alternate process for modifying the properties of a porous freeform part comprises placing the freeform part in an empty vacuum dessicator, drawing a vacuum on the freeform part and then introducing an infiltrant into the vacuum dessicator such that the infiltrant enters the pores within the freeform part.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A densified freeform-fabricated fiber free part produced by the process of:
    (a) providing a porous fiber free freeform fabricated part and depositing said part into a bath comprising an infiltrant which includes a ceramic precursor or ceramic containing phase and wherein said ceramic or ceramic containing phase originates from a precursor selected from the group consisting of polysilane, polysilazane, silicon oxycarbide (SiOC), poly(methylviylsilane), poly(aluminosilazane, perhydridopolysilazane, poly(borosilazane), polycarbosilazane, poly(siloxane), poly(carbosilane) and mixtures thereof
    (b) infiltrating the porous freeform fabricated part such that the infiltrant enters at least a portion of the pores resulting in a densified freeform fabricated part; and
    (c) removing the densified freeform fabricated part from the bath.

2. A densified freeform fabricated part, comprising:
    (a) a fiber free freeform fabricated part having pores therein; and
    (b) a ceramic or a ceramic containing-phase contained within a portion of said pores, and wherein said ceramic or ceramic containing phase originates from a precursor selected from the group consisting of polysilane, polysilazane, silicon oxycarbide (SiOC), poly(methylvinylsilane), poly(aluminosilazane), perhydridopolysilazane, poly(borosilazane), polycarbosilazane, poly(siloxane), poly(carbosilane) and mixtures thereof.

3. The freeform-fabricated part of claim 2 wherein the freeform fabricated part is either a metal, ceramic or a mixture thereof.

* * * * *